(12) United States Patent
Zhao et al.

(10) Patent No.: US 8,771,617 B2
(45) Date of Patent: Jul. 8, 2014

(54) METHOD FOR EXTRACTING TUNGSTEN FROM SCHEELITE

(71) Applicant: Central South University, Changsha (CN)

(72) Inventors: Zhongwei Zhao, Changsha (CN); Jiangtao Li, Changsha (CN)

(73) Assignee: Central South University, Changsha (CN)

( * ) Notice: Subject to any disclaimer, the term of this patent is extended or adjusted under 35 U.S.C. 154(b) by 0 days.

(21) Appl. No.: 13/794,844

(22) Filed: Mar. 12, 2013

(65) Prior Publication Data

US 2013/0195737 A1    Aug. 1, 2013

Related U.S. Application Data

(63) Continuation-in-part of application No. PCT/CN2011/001895, filed on Nov. 11, 2011.

(30) Foreign Application Priority Data

Dec. 24, 2010  (CN) .......................... 2010 1 0605094
Dec. 24, 2010  (CN) .......................... 2010 1 0605095
Dec. 24, 2010  (CN) .......................... 2010 1 0605103
Dec. 24, 2010  (CN) .......................... 2010 1 0605107
Dec. 24, 2010  (CN) .......................... 2010 1 0605110

(51) Int. Cl.
    *C22B 34/00*     (2006.01)

(52) U.S. Cl.
    USPC ............. 423/55; 423/56; 423/593.1; 423/305

(58) Field of Classification Search
    USPC .................... 423/55, 56, 593.1, 305
    See application file for complete search history.

(56) References Cited

U.S. PATENT DOCUMENTS

3,047,361 A * 7/1962 Hubbard et al. ............... 423/54
4,168,296 A * 9/1979 Lundquist ...................... 423/56

\* cited by examiner

*Primary Examiner* — Steven Bos
(74) *Attorney, Agent, or Firm* — Matthias Scholl P.C.; Matthias Scholl

(57) ABSTRACT

A method for extracting tungsten from scheelite by: 1) adding a mixed acid including $H_2SO_4$ and $H_3PO_4$ to a decomposition reactor; 2) heating the mixed acid to a temperature of 70-100° C.; adding scheelite while controlling the mixed acid present in an amount of 3-8 L per kg of scheelite; allowing the components in the decomposition reactor to react for 1-6 h, and filtering the resulting mixture to obtain a filtrate; 3) supplementing the filtrate with sulfuric acid consumed in the reaction; 4) crystallizing the filtrate to obtain phosphotungstic acid crystals and mother liquor; 5) dissolving the phosphotungstic acid crystals in water to obtain a phosphotungstic acid solution; 6) transforming the phosphotungstic acid solution into an ammonium tungstate solution for the purpose of preparing ammonium paratungstate; and 7) supplementing the mother liquor with phosphoric acid and water to an initial level and reusing the mother liquor for ore leaching.

11 Claims, 7 Drawing Sheets

METHOD FOR EXTRACTING TUNGSTEN FROM SCHEELITE

CROSS-REFERENCE TO RELATED APPLICATIONS

This application is a continuation-in-part of International Patent Application No. PCT/CN2011/001895 with an international filing date of Nov. 11, 2011, designating the United States, now pending, and further claims priority benefits to Chinese Patent Application No. 201010605094.7 filed Dec. 24, 2010, to Chinese Patent Application No. 201010605095.1 filed Dec. 24, 2010, to Chinese Patent Application No. 201010605103.2 filed Dec. 24, 2010, to Chinese Patent Application No. 201010605107.0 filed Dec. 24, 2010, and to Chinese Patent Application No. 201010605110.2 filed Dec. 24, 2010. The contents of all of the aforementioned applications, including any intervening amendments thereto, are incorporated herein by reference. Inquiries from the public to applicants or assignees concerning this document or the related applications should be directed to: Matthias Scholl P.C., Attn.: Dr. Matthias Scholl Esq., 14781 Memorial Drive, Suite 1319, Houston, Tex. 77079.

BACKGROUND OF THE INVENTION

1. Field of the Invention

The invention relates to a hydrometallurgical field, and more particularly to a method for extracting tungsten from scheelite.

2. Description of the Related Art

A typical method for processing scheelite includes an autoclaving step in which sodium carbonate is used as a leaching agent. The method can stably decompose scheelite, yielding a product in which residual $WO_3$ can be controlled to be less than 1%; however, the reagent dosage requirements are too large to render this method practical: about three times of the theoretical dosage. In some lab experiments, the dosage required to practice this method can reach even 5-6 times of the theoretical dosage. Furthermore, the operation temperature for this method is very high, about 225° C., and the pressure of the device is 20 atm.

Another method for processing scheelite includes a step of autoclaving using NaOH as a leaching agent, and more than 80% of ammonium paratungstate (APT) produced in China occurs by this method. The method is carried out by adding large amounts of NaOH in a high concentration and at a high temperature and pressure, so that the scheelite can be effectively decomposed. Residual $WO_3$ in the product can be lowered to 1-3%. However, the technique consumes large amounts of energy, the production costs are high, and large amounts of wastewater are produced in the subsequent process.

Acid decomposition is a method that mainly uses hydrochloric acid to process scheelite concentrate. A thermodynamic study of this method proved that the reaction rate is fast. However, during the hydrochloric acid decomposition, tungstic acid in the form of a yellow gel can wrap around undecomposed scheelite particles, which results in incomplete decomposition. The hydrochloric acid generates serious problems for the processing step by generating acid corrosion and volatilization of the acid. These effects produce poor working conditions. Finally, after treating the remnant mother liquor of the hydrochloric acid with lime, large amounts of a $CaCl_2$ solution are discharged. For these reasons, this method has been discarded.

Tungsten, phosphorus, arsenic, silicon, and other impurities can form a soluble heteropoly acid (for example, $[PW_{12}O_{40}]^{3-}$) having a 1:6-1:12 ratio of impurities to tungsten. During the hydrochloric acid decomposition, even small amounts of phosphorus can cause the loss of large amounts of tungsten into the leaching solution. The hydrochloric acid decomposition step is mainly used to process scheelite concentrates that are highly pure, with very low content levels of phosphorus, arsenic and other impurities. However, it implies us that the intentional addition of a small amount of phosphoric acid during the leaching process can cause tungsten in the solution to form a soluble phosphotungstic heteropoly acid. The problem associated with tungstic acid wrapping during the hydrochloric acid decomposition can be overcome. Studies have shown that the yellow tungstic acid still forms at low levels of phosphorus; therefore, a large excess coefficient for phosphorus is required. Large quantities of phosphorus increase the leaching speed. Corrosion and volatilization problems associated with the hydrochloric acid still exist; thus, the results of the study have not been applied in industry.

To address the problem associated with the corrosion and volatilization of hydrochloric acid and to realize the tungsten leaching in the form of a soluble phosphotungstic heteropoly acid, sulfuric acid can substitute for hydrochloric acid. However, in the presence of a large amount of sulfuric acid, the supersaturated gypsum quickly nucleates to form a large amount of fine crystals that produce wrapping. The decomposition effects are, therefore, insufficient. During the sulfuric acid decomposition step, phosphoric acid, calcium phosphate, or phosphorite is added to provide phosphorus as a complexing agent for tungsten. A certain amount of NaCl is also needed to improve the decomposition. Then, HCl in the strong sulfuric acid-containing solution has a high degree of activity due to the high concentration of hydrochloride acid. Thus, problems like the corrosion of $Cl^-$ come out again.

The principles underlying the action of NaCl are as follows: the chloride ions can significantly increase the induction period of the calcium sulfate crystals, thereby preventing the calcium sulfate crystals from nucleating. To a certain degree, it is helpful to form large crystals and prevent the products from wrapping the minerals and obstructing the decomposition reaction. However, in actual fact, adding NaCl cannot promote ideal decomposition; rather, it raises problems such as device corrosion and HCl volatilization. NaCl cannot prevent tungstic acid wrapping.

SUMMARY OF THE INVENTION

Our study shows that, the use of a phosphoric acid solution having a high concentration (a concentration of $P_2O_5$ is 15-35%) to decompose a scheelite can largely improve the formation rate of a soluble of phosphotungstic acid, thereby avoiding tungstic acid precipitation and wrapping, as shown in equation (1).

$$12CaWO_4+25H_3PO_4=12Ca(H_2PO_4)_2.H_2O+H_3[PW_{12}O_{40}]+11H_2O \quad (1)$$

Furthermore, phosphoric acid has a low corrosive effect, and does not volatilize the way that hydrochloric acid does.

However, phosphoric acid has a high production cost. Large amounts of phosphorus are present in the form of $Ca(H_2PO_4)_2.H_2O$, which leads to difficulties in carrying out further reactions. Thus, during the decompostion process, a certain amount of $H_2SO_4$ can be added to react with $Ca(H_2PO_4)_2.H_2O$, so that calcium is precipitated in the form of calcium sulfate. Phosphoric acid is formed again, thereby lowering the consumption of phosphoric acid. The equation (2) is as follows:

$$Ca(H_2PO_4)_2 \cdot H_2O + H_2SO_4 \rightarrow CaSO_4 \cdot nH_2O + H_3PO_4 \quad (2)$$

A total equation is:

$$12CaWO_4 + H_3PO_4 + 12H_2SO_4 + 12nH_2O = 12CaSO_4 \cdot nH_2O + H_3[PW_{12}O_{40}] + 12H_2O \quad (3)$$

Furthermore, a phosphoric acid solution having a high concentration can effectively lower the degree of supersaturation of calcium sulfate during the decomposition of tungsten ore. This is because phosphoric acid can complexes with calcium ions, thereby increasing the solubility of calcium sulfate as the concentration of phosphoric acid increases. The highest concentrations are reached when the $P_2O_5$ concentration is about 20 wt. %. The solubility of calcium sulfate at 80° C. is 5-7 times the value in the absence of phosphoric acid. Even at $P_2O_5$ as high as 40%, the solubility of calcium sulfate is 3-5 times the solubility in the absence of phosphoric acid. The possibility of nucleating calcium sulfate is lowered. Thus, large crystals easily form, the formation of compact calcium sulfate is prevented, and scheelite is leached effectively.

One strategy for scheelite leaching involves using a high concentration of phosphoric acid to decompose scheelite, with the addition of a certain amount of sulfuric acid to form phosphoric acid again. This method addresses the problem associated with wrapping of tungstic acid, solubilizes tungsten in solution in the form of phosphotungstic acid, and prevents the formation of a compact calcium sulfate film. The objective of the scheelite decomposition process is, therefore, achieved with a high efficiency. Furthermore, studies have shown that the solubility of phosphotungstic acid is largely affected by the concentrations of phosphoric acid and sulfuric acid, and by the reaction temperature. These properties reveal certain features of the process of phosphotungstic acid extraction from the leaching agent. As an example, for a system having a phosphoric acid concentration of 20 wt. % $P_2O_5$, the relationship between the solubility of the phosphotungstic acid, the concentration of sulfuric acid, and the temperature is shown in FIG. 1. The crystals that formed from this system are shown in FIG. 2. That is, under conditions in which the acid concentration is high, phosphotungstic acid can be crystallized from a lixivium by cooling crystallization or concentrated crystallization, so that tungsten is separated from the lixivium. This method can largely simplify the process flow. The mother liquor is then added with the leaching agent, brought to an original level of the leaching agent, and used to carry out a next leaching step.

In view of the above-described problems, it is one objective of the invention to provide a method for extracting tungsten from scheelite that is free of pollution, has a low cost, has a low energy consumption, is convenient to operate, and proceeds with a high efficiency.

To achieve the above objectives, in accordance with one embodiment of the invention, there is provided a method for extracting tungsten from scheelite, the method comprising:

1) adding a mixed acid comprising sulfuric acid and phosphoric acid into a decomposition reactor, the mixed acid comprising 150-500 g/L of $H_2SO_4$ and 15-35 wt. % of $P_2O_5$;
2) heating the decomposition reactor to a temperature of 70-100° C.; adding scheelite into the decomposition reactor to obtain a mixture and controlling the mixed acid present in an amount of 3-8 L per kg of scheelite; allowing the mixture to react for 1-6 h, and filtering the mixture to collect a filtrate;
3) supplementing the filtrate with sulfuric acid, which had been consumed during the reaction;
4) crystallizing the filtrate obtained in step 3) to obtain phosphotungstic acid crystals and a mother liquor;
5) dissolving the phosphotungstic acid crystals in water to obtain a phosphotungstic acid solution;
6) transforming the phosphotungstic acid solution to an ammonium tungstate solution for preparing APT; and
7) supplementing the mother liquor obtained in step 4) with phosphoric acid and water to allow the mother liquor to have the same $H_2SO_4$ and $P_2O_5$ concentrations in step 1) and returning the mother liquor for a new round of ore leaching.

In a class of this embodiment, the scheelite comprises 10-75 wt. % of $WO_3$ and has a grain size≤150 μm.

In a class of this embodiment, the phosphotungstic acid crystals are obtained using a cooling crystallization process by cooling the filtrate to 30-50° C. and filtering; or the phosphotungstic acid crystals are obtained using a concentrated crystallization process by concentrating the filtrate to a volume that is ⅓-⅘ of the original volume, and filtering.

In a class of this embodiment, the phosphotungstic acid solution obtained from dissolving the phosphotungstic acid crystals comprises 350-500 g/L of $WO_3$. The phosphotungstic acid solution is then transformed into the ammonium tungstate solution comprising 200-300 g/L of $WO_3$ by ammonia, performing an ion exchange reaction, or using solvent extraction techniques.

Advantages of the invention are summarized as follows:
1. the method has no strict requirement for the phosphorus content in the scheelite, and a phosphorus removal process is not needed during the mineral beneficiation, thereby reducing the reagent for the phosphorus removal step and reducing the loss of tungsten;
2. phosphoric acid in a high concentration can effectively lower the degree of supersaturation of calcium sulfate during the decomposition of the tungsten ore. This is because phosphoric acid can complex calcium ions, so that the solubility of the calcium sulfate increases as the concentration of the phosphoric acid increases. The possibility of nucleating the calcium sulfate is, therefore, lowered. Large crystals then easily form, and at the same time, the formation of a compact calcium sulfate is prevented, thereby resulting in effective leaching of the scheelite. The method saves resource and energy, and has a decomposition rate exceeding 99%;
3. in a leaching system comprising high concentrations of phosphoric acid and sulfuric acid, the solubility of the obtained phosphotungstic acid significantly varies in accordance with the change of concentration of sulfuric acid and the temperature; thus, a cooling crystallization process or a concentrated crystallization process can be carried out to realize the extraction of tungsten;
4. the method overcomes the serious problems associated with corrosion by $Cl^-$ and HCl volatilization, which are present in the conventional acid decomposition process;
5. the method realizes the recycling of phosphoric acid and the sulfuric acid. During the process, $P_2O_5$ loss can be reduced to less than 5%. The consumption of sulfuric acid is equal to the theoretical consumption of calcium in the ore, which largely decreases the leaching cost and the discharge of waste water; and
6. the method's procedure is brief, operation is convenient, and industrialization may proceed easily.

BRIEF DESCRIPTION OF THE DRAWINGS

The invention is described hereinbelow with reference to the accompanying drawings, in which.

DETAILED DESCRIPTION OF THE EMBODIMENTS

To further illustrate the invention, experiments detailing a method for extracting tungsten from scheelite are described below. It should be noted that the following examples are intended to describe and not to limit the invention.

Example 1

The use of phosphoric acid in high concentrations can effectively lower the degree of supersaturation of calcium sulfate during the decomposition of the tungsten ore. This is because phosphoric acid can complex calcium ions. Therefore, the solubility of calcium sulfate increases as the concentration of phosphoric acid increases, and the possibility of nucleating calcium sulfate crystals is lowered. Thus, large crystals form easily and the formation of a compact calcium sulfate precipitate is prevented. Scheelite is leached effectively through these methods. Experiments were carried out as follows.

Figure 1:
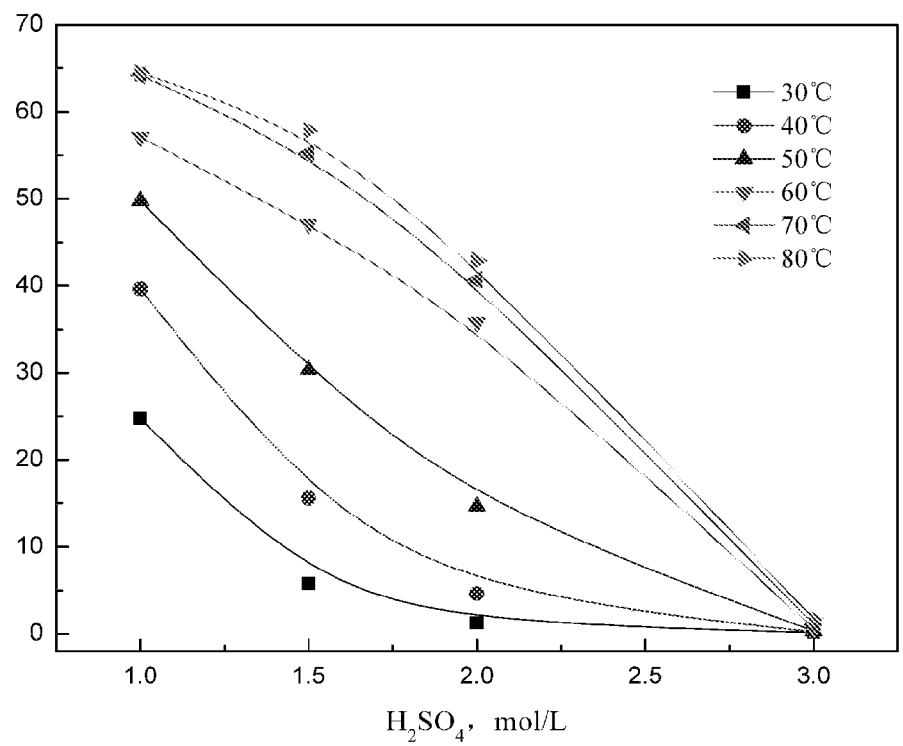
FIG. 1 shows the relationship between the solubility of phosphotungstic acid and the concentration of sulfuric acid and temperature.
Figure 2:
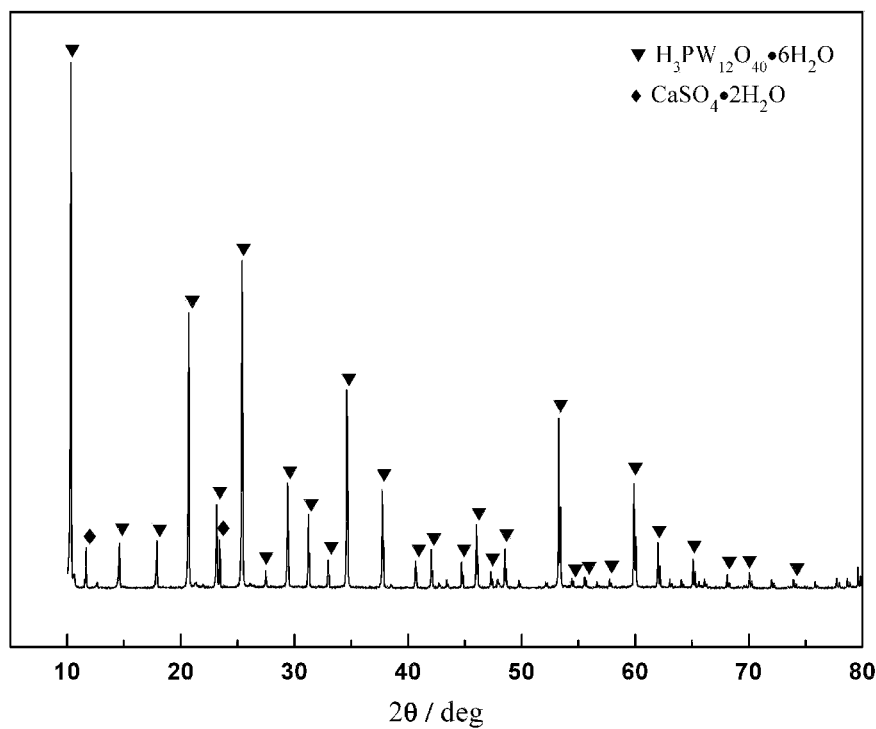
FIG. 2 shows an X-Ray diffraction (XRD) map obtained from the phosphotungstic acid crystals.
Figure 3:
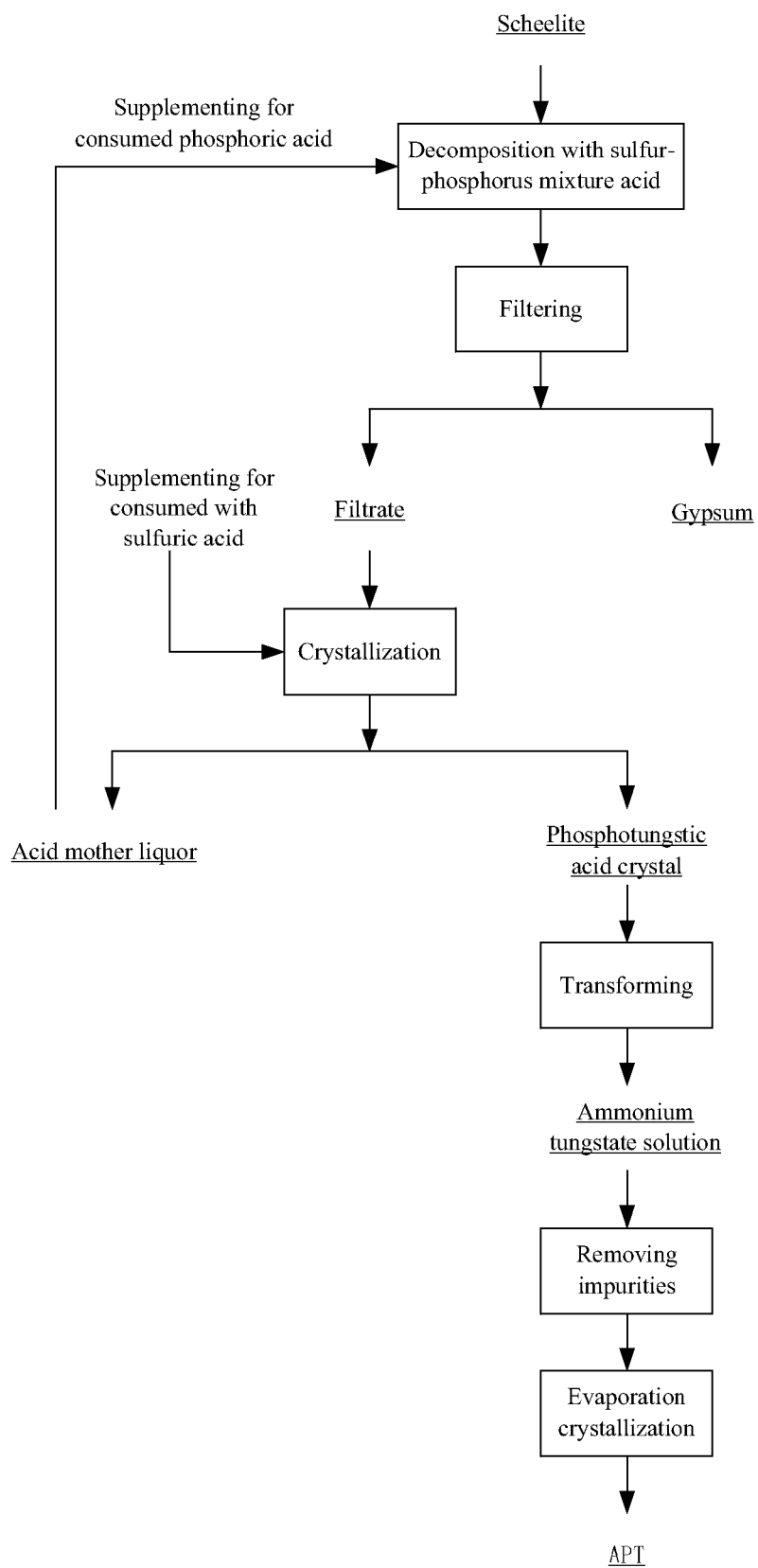
FIG. 3 shows a flow chart illustrating the method for extracting tungsten from scheelite in accordance with one embodiment of the invention.
Figure 4:
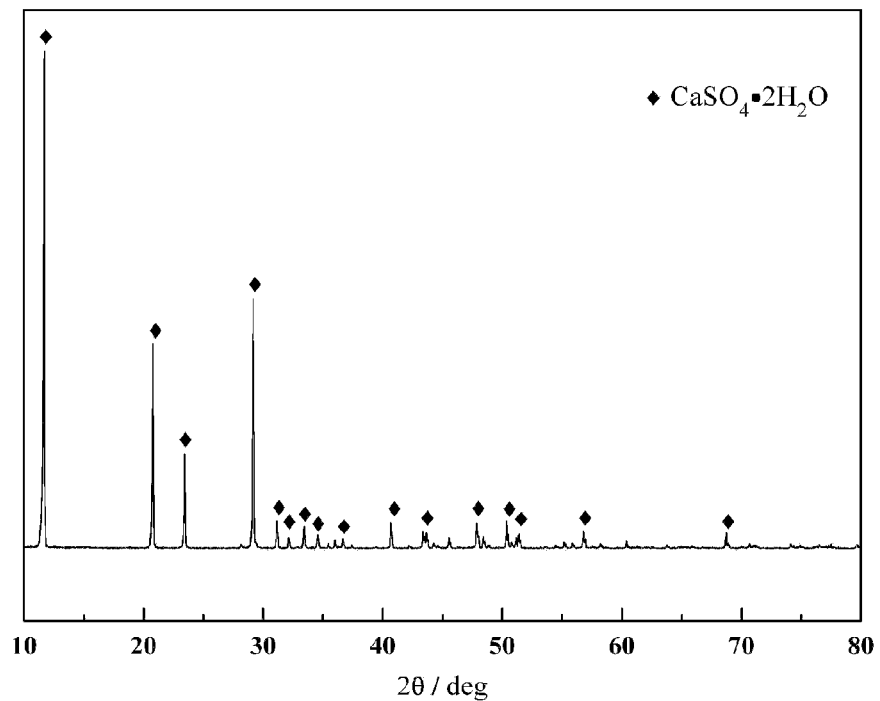
FIG. 4 shows an XRD map of the residue obtained after decomposition in accordance with Example 1.
Figure 5:
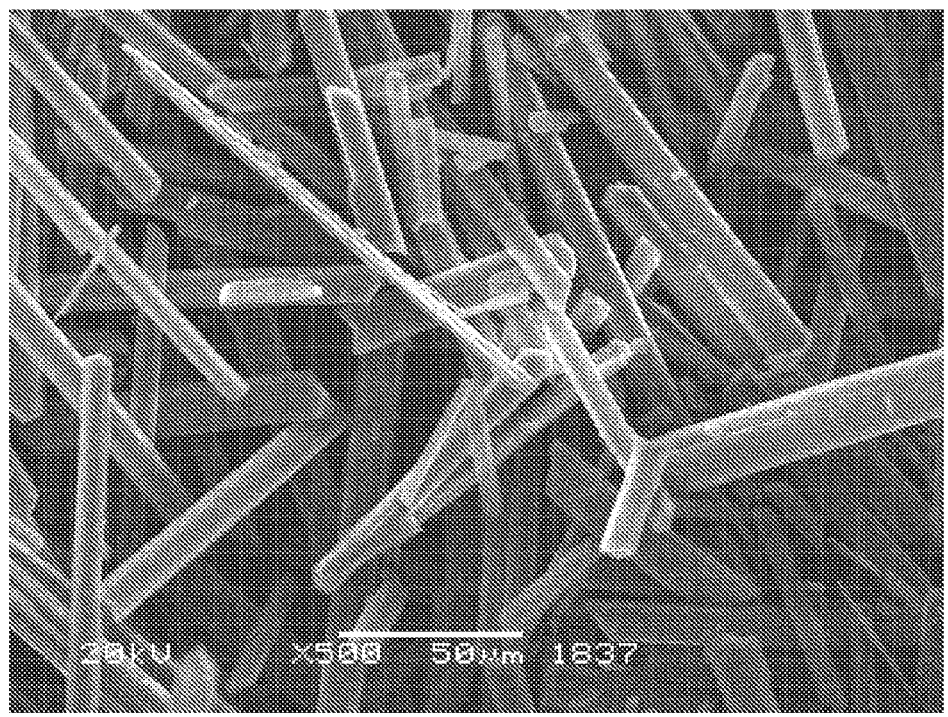
FIG. 5 shows a scanning electron microscope (SEM) image of a residue obtained after decomposition in accordance with Example 1.

A phosphoric acid solution having 20 wt. % of $P_2O_5$ was prepared, and sulfuric acid was added and mixed with the phosphoric acid solution to obtain a mixed acid solution. The concentration of $H_2SO_4$ was controlled at 150 g/L. Thereafter, 5 L of the mixed acid solution was added into the decomposition reactor, and was heated to a temperature of 90° C. Then 1 kg sample of scheelite having 70.6 wt. % $WO_3$ was added to the decomposition reactor (with the mixed acid present in an amount of 5 L per kg of scheelite), and the reaction was carried out for 6 h. The leaching rate of tungsten was 99.3%. An XRD map and an SEM image of the residue are shown in FIGS. 4 and 5, respectively.

Comparative Example 1

Figure 6:
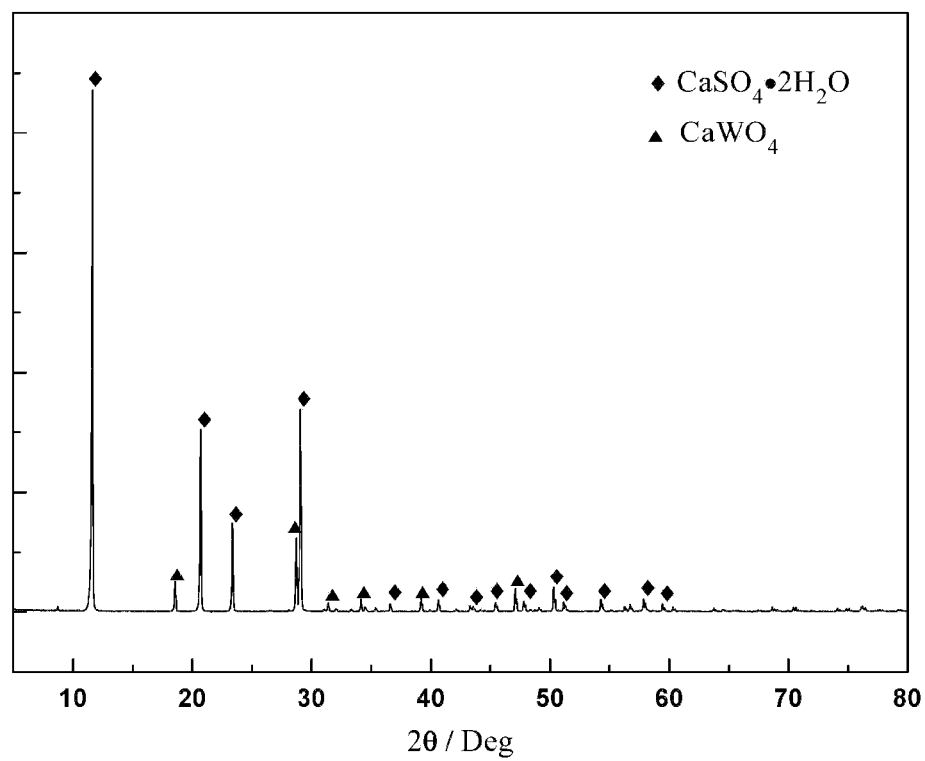
FIG. 6 shows an XRD map obtained from the residue formed after decomposition reaction in accordance with the comparative Example 1.
Figure 7:
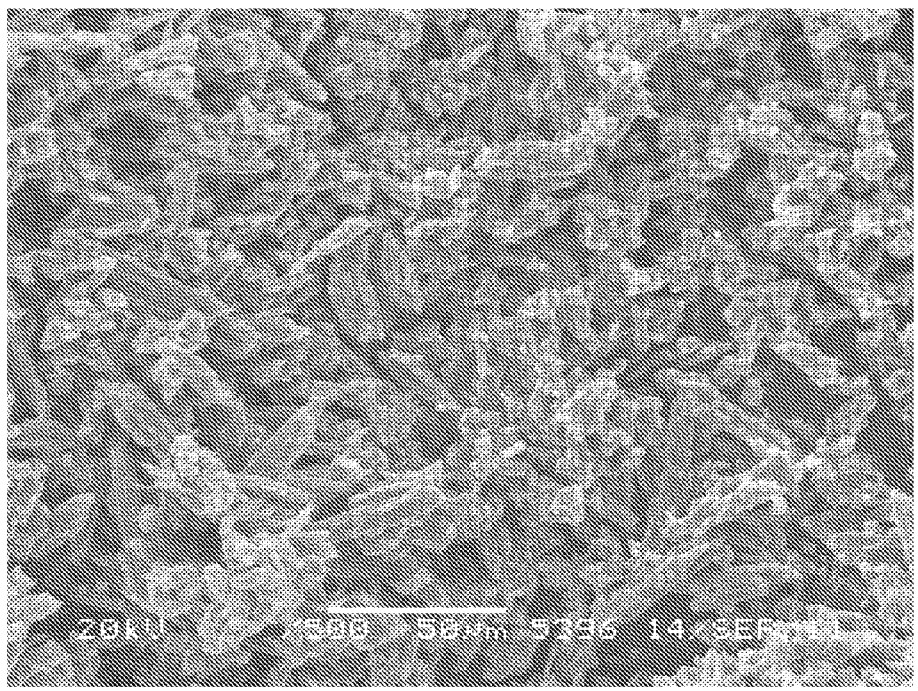
FIG. 7 shows an SEM image of a residue formed after the decomposition reaction in accordance with comparative Example 1.

The use of phosphoric acid in a low concentration was tested as described in the following experimental procedures:

A phosphoric acid solution having 5 wt. % of $P_2O_5$ was prepared. Sulfuric acid was added and mixed with the phosphoric acid solution to obtain a mixed acid solution. The concentration of $H_2SO_4$ was controlled at 150 g/L. Thereafter, 5 L of the mixed acid solution was added to the decomposition reactor, which was then heated to a temperature of 90° C. Then 1 kg sample of scheelite having 70.6 wt. % of $WO_3$ was added to the decomposition reactor (with the mixed acid present in an amount of 5 L per kg of scheelite), and the reaction was carried out for 6 h. The leaching rate of tungsten was 87.6%. An XRD map and an SEM image of the residue are shown in FIGS. 6 and 7, respectively.

Example 2

A phosphoric acid solution having 20 wt. % of $P_2O_5$ was prepared, and sulfuric acid was added and mixed with the phosphoric acid solution to obtain a mixed acid solution. The concentration of $H_2SO_4$ was controlled at 150 g/L. Thereafter, 6 L of the mixed acid solution was added to the decomposition reactor, and was heated to a temperature of 80° C. Then 1 kg sample of scheelite having 70.6 wt. % of $WO_3$ was added to the decomposition reactor (with the mixed acid present in an amount of 6 L per kg of scheelite), and the reaction was carried out for 6 h. The leaching rate of tungsten was 99.2%. The reaction mixture was then filtered, and a filtrate was obtained. The filtrate was condensed to a volume equal to ⅓ of the original volume via condensed crystallization after being supplemented for the consumed sulfuric acid. Under such conditions, the crystallization rate of phosphotungstic acid was 85.3%. After filtrating the crystals, a mother liquor was obtained. After being supplemented with phosphoric acid and water to an original level, the mother liquor was returned for ore leaching. The phosphotungstic acid crystals were dissolved in water to obtain a phosphotungstic acid solution having 489.3 g/L of $WO_3$. The solution was then added into an ammonia solution to obtain an ammonium tungstate solution having 250.6 g/L of $WO_3$.

Example 3

A phosphoric acid solution having 15 wt. % of $P_2O_5$ was prepared, and sulfuric acid was added and mixed with the phosphoric acid solution to obtain a mixed acid solution. The concentration of $H_2SO_4$ was controlled at 300 g/L. Thereafter, 4 L of the mixed acid solution was added to the decomposition reactor, and was heated to a temperature of 90° C. Then 1 kg sample of scheelite having 70.6 wt. % of $WO_3$ was added to the decomposition reactor (with the mixed acid present in an amount of 4 L per kg of scheelite). The reaction was carried out for 4 h. The leaching rate of tungsten was 99.5%. The reaction mixture was filtered, and a filtrate was obtained. The filtrate was cooled to a temperature of 30° C. after being supplemented for the consumed sulfuric acid. Under these conditions, the crystallization rate of phosphotungstic acid was 82.1%. After a second filtrating the crystals, a mother liquor was obtained. After being supplemented with phosphoric acid and water to an original level, the mother liquor was returned for ore leaching. The phosphotungstic acid crystals were dissolved in water to obtain a phosphotungstic acid solution having 396.7 g/L of $WO_3$. The solution was then added into an ammonia solution to obtain an ammonium tungstate solution having 262.3 g/L of $WO_3$.

Example 4

A phosphoric acid solution having 35 wt. % of $P_2O_5$ was prepared, and sulfuric acid was added and mixed with the phosphoric acid solution to obtain a mixed acid solution. The concentration of $H_2SO_4$ was controlled at 200 g/L. Thereafter, 3 L of the mixed acid solution was added to the decomposition reactor, and was heated to a temperature of 70° C. Then 1 kg of scheelite having 70.6 wt. % of $WO_3$ was added to the decomposition reactor (with the mixed acid present in an amount of 3 L per kg of scheelite). The reaction was carried out for 5 h. The leaching rate of tungsten was 99.0%. The reaction was then filtered, and a filtrate was obtained. After being supplemented for the consumed sulfuric acid, the filtrate was condensed to a volume equal to ⅘ of an original volume by condensed crystallization. Under such conditions, a crystallization rate of phosphotungstic acid was 81.7%. After filtrating the crystals, a mother liquor was obtained. The mother liquor was supplemented with phosphoric acid and water to an original level, and was returned for ore leaching. The phosphotungstic acid crystals were dissolved in water to obtain a phosphotungstic acid solution having 358.4 g/L of $WO_3$. D301 resin was used to adsorb tungsten from the phosphotungstic acid solution. 99.1% of tungsten was absorbed. After desorption in an ammonia solution, an ammonium tungstate solution having 209.3 g/L of $WO_3$ was obtained. The solution obtained from ion exchange was used to dissolve the phosphotungstic acid crystals.

Example 5

A phosphoric acid solution having 35 wt. % of $P_2O_5$ was prepared, and sulfuric acid was added and mixed with the phosphoric acid solution to obtain a mixed acid solution. The concentration of $H_2SO_4$ was controlled at 500 g/L. Thereafter, 8 L of the mixed acid solution was added into the decomposition reactor, and was heated to a temperature of 90° C. Then 1 kg sample of a scheelite having 65.7 wt. % of $WO_3$ was added to the decomposition reactor (with the mixed acid present in an amount of 8 L per kg of scheelite), and the reaction was carried out for 1 h. The leaching rate of tungsten was 99.0%. The reaction mixture was filtered, and a filtrate was obtained. The filtrate was cooled to a temperature of 50° C. after being supplemented for the consumed sulfuric acid. Under such conditions, a crystallization rate of the phosphotungstic acid was 62.7%. After filtrating the crystals, a mother liquor was obtained. After being supplemented with phosphoric acid and water to the original level, the mother liquor was returned for ore leaching. The phosphotungstic acid crystals were dissolved in water to obtain a phosphotungstic acid solution having 404.1 g/L of $WO_3$. This solution was then added into an ammonia solution to obtain an ammonium tungstate solution having 228.7 g/L of $WO_3$.

Example 6

A phosphoric acid solution having 25 wt. % of $P_2O_5$ was prepared, and sulfuric acid was added and mixed with the phosphoric acid solution to obtain a mixed acid solution. The concentration of $H_2SO_4$ was controlled at 250 g/L. Thereafter, 4 L of the mixed acid solution was added to the decomposition reactor, and was heated to a temperature of 100° C. Then 1 kg sample of scheelite having 65.7 wt. % of $WO_3$ was added to the decomposition reactor (with the mixed acid present in an amount of 4 L per kg of scheelite). The reaction was carried out for 3 h. The leaching rate of tungsten was 99.3%. The reaction mixture was filtered, and a filtrate was obtained. The filtrate was cooled to a temperature of 40° C. after being supplemented for the consumed sulfuric acid. Under such conditions, a crystallization rate of the phosphotungstic acid was 67.1%. The phosphotungstic acid crystals were dissolved in water to obtain a phosphotungstic acid solution having 425.8 g/L of $WO_3$. The solution was then added to an ammonia solution to obtain an ammonium tungstate solution having 231.4 g/L of $WO_3$.

Example 7

The mother liquor obtained from the crystallization reaction of Example 6 was used as follows. After being supplemented with sulfuric acid, phosphoric acid, and water to bring $P_2O_5$ concentration to be 25 wt. % and $H_2SO_4$ concentration to be 250 g/L, the mother liquor was used for decomposing a 1 kg scheelite having 65.7 wt. % of $WO_3$. The mixed acid is present in an amount of 4 L per kg of scheelite, and the reaction was carried out at a temperature of 100° C. for 3 h. The leaching rate of tungsten was 99.2%. The reaction mixture was filtered, and a filtrate was obtained. The filtrate was condensed to a volume equal to ½ of the original volume via condensed crystallization after being supplemented with sulfuric acid to compensate for the consumed sulfuric acid. Under such conditions, a crystallization rate of the phosphotungstic acid was 86.4%. After filtrating the crystals, a new mother liquor was obtained. The mother liquor was supplemented with phosphoric acid and water to the original level, and was returned for ore leaching. The phosphotungstic acid crystals were dissolved in water to obtain a phosphotungstic acid solution having 367.3 g/L of $WO_3$. This solution was then added to an ammonia solution to obtain an ammonium tungstate solution having 253.8 g/L of $WO_3$, 2.4 g/L of P, and 25.6 g/L of $SO_4^{2-}$. An ammonium magnesium salt method was adopted to remove impurities. A $MgCl_2$ solution having 200 g/L of $MgCl_2$ was added according to 1.2 molar ratio of Mg to P. The reaction was maintained for 30 min at room temperature, and then filtered. 99.9% of phosphorus was removed, and the loss of tungsten was only 0.05 wt. %. Mo was removed according to a method disclosed in Pat. No. 97108113.1. The resulting solution was crystallized by volatilization to obtain APT crystals. The crystallization rate of APT was 94.5%. Analysis results of the products are shown in Table 1.

TABLE 1

Analysis results of an APT having a crystallization rate of 94.5 wt. %

| Element | Content (wt. %) | Element | Content (wt. %) | Element | Content (wt. %) |
|---|---|---|---|---|---|
| P | 0.00043 | Mg | <0.0007 | Bi | <0.0001 |
| K | <0.001 | Ni | <0.0005 | Sn | <0.0001 |
| Na | 0.001 | Ti | <0.0005 | Sb | 0.0002 |
| Mo | 0.0034 | V | <0.0005 | Cu | <0.0001 |
| Al | <0.0005 | Co | <0.0005 | Ca | <0.0005 |
| Si | <0.0005 | Cd | — | Cr | <0.0010 |
| Mn | <0.0005 | Pb | <0.0001 | As | 0.0007 |

Example 8

A phosphoric acid solution having 35 wt. % of $P_2O_5$ was prepared, and sulfuric acid was added and mixed with the phosphoric acid solution to obtain a mixed acid solution. The concentration of $H_2SO_4$ was controlled at 300 g/L. Thereafter, 5 L of the mixed acid solution was added to the decomposition reactor, which was then heated to a temperature of 90° C. Then 1 kg sample of scheelite having 45.9 wt. % of $WO_3$ was added to the decomposition reactor (with the mixed acid present in an amount of 5 L per kg of scheelite), and the reaction was carried out for 6 h. The leaching rate of tungsten was 99.0%. The reaction mixture was filtered, and a filtrate was obtained. The filtrate was condensed to a volume equal to ⅔ of an original volume by condensed crystallization after being supplemented for the consumed sulfuric acid. Under such conditions, a crystallization rate of the phosphotungstic acid was 84.7%. After filtrating the crystals, a mother liquor was obtained. The mother liquor was supplemented with phosphoric acid and water to the original level, and was returned for ore leaching. The phosphotungstic acid crystals were dissolved in water to obtain a phosphotungstic acid solution having 376.8 g/L of WO$_3$, and this solution was then extracted using a primary amine as an extractant. 98.8% of tungsten was extracted. Thereafter, an ammonia solution was used as a stripping agent, yielding an ammonium tungstate solution having 205.2 g/L of WO$_3$. The liquor from the extraction step was used to dissolve the phosphotungstic acid crystals.

Example 9

A phosphoric acid solution having 25 wt. % of P$_2$O$_5$ was prepared, and sulfuric acid was added and mixed with the phosphoric acid solution to obtain a mixed acid solution. The concentration of H$_2$SO$_4$ was controlled at 500 g/L. Thereafter, 3 L of the mixed acid solution was added to the decomposition reactor, which was heated to a temperature of 90° C. Then 1 kg sample of scheelite having 30.4 wt. % of WO$_3$ was added to the decomposition reactor (with the mixed acid present in an amount of 3 L per kg of scheelite), and the reaction was carried out for 4 h. The leaching rate of tungsten was 98.9%. The reaction mixture was filtered, and a filtrate was obtained. The filtrate was condensed to a volume equal to ⅓ of the original volume by condensed crystallization after being supplemented for the consumed sulfuric acid. Under such conditions, a crystallization rate of the phosphotungstic acid was 72.9%. After filtrating the crystals, a mother liquor was obtained. After being supplemented with phosphoric acid and water to the original level, the mother liquor was returned for ore leaching. The phosphotungstic acid crystals were dissolved in water to obtain a phosphotungstic acid solution having 364.7 g/L of WO$_3$. This solution was then added into an ammonia solution to obtain an ammonium tungstate solution having 225.1 g/L of WO$_3$.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

The invention claimed is:

1. A method for extracting tungsten from scheelite, the method comprising the steps of:
   1) adding a mixed acid comprising sulfuric acid and phosphoric acid into a decomposition reactor, wherein the sulfuric acid is present in the mixed acid at a concentration of 150-500 g/L and the phosphoric acid is present in the mixed acid at a concentration corresponding to 15-35 wt. % of P$_2$O$_5$;
   2) heating the mixed acid to a temperature of 70-100° C.; adding scheelite to the decomposition reactor and controlling an amount of the mixed acid present in the decomposition reactor at 3-8 L per kg of scheelite; allowing components in the decomposition reactor to react for 1-6 hr, and filtering to obtain a filtrate;
   3) supplementing the filtrate with sulfuric acid;
   4) crystallizing the filtrate of step 3) to obtain phosphotungstic acid crystals and a mother liquor;
   5) dissolving the phosphotungstic acid crystals in water to obtain a phosphotungstic acid solution;
   6) transforming the phosphotungstic acid solution to an ammonium tungstate solution for preparing ammonium paratungstate (APT); and
   7) supplementing the mother liquor of step 4) with phosphoric acid and water to obtain a diluted mother liquor comprising sulfuric acid and phosphoric acid at the same concentrations as those in step 1), and using the diluted mother liquor as the mixed acid in step 1) for leaching scheelite.

2. The method of claim 1, wherein the scheelite comprises 10-75 wt. % of WO$_3$ and has a grain size≤150 μm.

3. The method of claim 1, wherein
   the phosphotungstic acid crystals are obtained by cooling the filtrate of step 3) to 30-50° C. and filtering; or
   the phosphotungstic acid crystals are obtained by concentrating the filtrate of step 3) to have a ⅓-⅘ original volume, and filtering.

4. The method of claim 1, wherein
   the phosphotungstic acid solution obtained from dissolving the phosphotungstic acid crystals comprises 350-500 g/L of WO$_3$; and
   the phosphotungstic acid solution is transformed into the ammonium tungstate solution comprising 200-300 g/L of WO$_3$ by adding ammonia, ion exchange, or solvent extraction.

5. The method of claim 3, wherein
   the phosphotungstic acid solution obtained from dissolving the phosphotungstic acid crystals comprises 350-500 g/L of WO$_3$; and
   the phosphotungstic acid solution is transformed into the ammonium tungstate solution comprising 200-300 g/L of WO$_3$ by adding ammonia, ion exchange, or solvent extraction.

6. A method for extracting tungsten from scheelite, the method comprising:
   1) adding a mixed acid comprising sulfuric acid and phosphoric acid into a decomposition reactor, wherein the sulfuric acid is present in the mixed acid at a concentration of 150-500 g/L and the phosphoric acid is present in the mixed acid at a concentration corresponding to 15-35 wt. % of P$_2$O$_5$;
   2) heating the mixed acid to a temperature of 70-100° C.; adding scheelite to the decomposition reactor, leaching scheelite in the mixed acid, and controlling an amount of the mixed acid present in the decomposition reactor at 3-8 L per kg of scheelite; allowing components in the decomposition reactor to react for 1-6 hr, and filtering to obtain a filtrate;
   3) supplementing the filtrate with sulfuric acid;
   4) crystallizing the filtrate of step 3) to obtain phosphotungstic acid crystals and a mother liquor;
   5) dissolving the phosphotungstic acid crystals in water to obtain a phosphotungstic acid solution; and
   6) transforming the phosphotungstic acid solution to an ammonium tungstate solution for preparing ammonium paratungstate.

7. The method of claim 6, wherein the method further comprises supplementing the mother liquor of step 4) with phosphoric acid and water to obtain a diluted mother liquor comprising sulfuric acid and phosphoric acid at the same concentrations as those in step 1), using the diluted mother liquor as the mixed acid in step 1) for leaching scheelite, and repeating steps 2)-6).

8. The method of claim 6, wherein the scheelite comprises 10-75 wt. % of WO$_3$ and has a grain size≤150 μm.

9. The method of claim 6, wherein
   the phosphotungstic acid crystals are obtained by cooling the filtrate of step 3) to 30-50° C. and filtering; or
   the phosphotungstic acid crystals are obtained by concentrating the filtrate of step 3) to have a ⅓-⅘ original volume, and filtering.

10. The method of claim 6, wherein
the phosphotungstic acid solution obtained from dissolving the phosphotungstic acid crystals comprises 350-500 g/L of $WO_3$; and
the phosphotungstic acid solution is transformed into the ammonium tungstate solution comprising 200-300 g/L of $WO_3$ by adding ammonia, ion exchange, or solvent extraction.

11. The method of claim 9, wherein
the phosphotungstic acid solution obtained from dissolving the phosphotungstic acid crystals comprises 350-500 g/L of $WO_3$; and
the phosphotungstic acid solution is transformed into the ammonium tungstate solution comprising 200-300 g/L of $WO_3$ by adding ammonia, ion exchange, or solvent extraction.

\* \* \* \* \*